United States Patent [19]

Herms

[11] 3,926,301
[45] Dec. 16, 1975

[54] CONVEYOR ASSEMBLY
[75] Inventor: Heinrich Herms, Sindorf, Germany
[73] Assignee: O & K Orenstein & Koppel Aktiengesellschaft, Germany
[22] Filed: Aug. 16, 1974
[21] Appl. No.: 498,282

[30] Foreign Application Priority Data
Aug. 22, 1973 Germany.............................. 2342322

[52] U.S. Cl. ...................... 198/90; 198/91; 214/14
[51] Int. Cl.² ......................................... B65G 63/00
[58] Field of Search ............ 214/10, 14, 15 R, 15 E; 198/9, 36, 102, 103, 88, 91, 90

[56] References Cited
UNITED STATES PATENTS

| | | | |
|---|---|---|---|
| 1,421,787 | 7/1922 | Kininmonth ...................... | 214/14 X |
| 2,988,201 | 6/1961 | Ludwig ............................... | 214/14 X |
| 3,392,818 | 7/1968 | Baschant........................... | 214/14 X |
| 3,682,293 | 8/1972 | Kamp................................ | 198/103 X |
| 3,735,879 | 5/1973 | Grandin............................. | 214/14 |

FOREIGN PATENTS OR APPLICATIONS

| | | | |
|---|---|---|---|
| 25,062 | 8/1931 | Netherlands........................ | 214/14 |
| 1,914,706 | 10/1970 | Germany ............................. | 198/88 |
| 867,170 | 3/1971 | Canada............................... | 198/88 |

Primary Examiner—Frank E. Werner
Attorney, Agent, or Firm—McGlew and Tuttle

[57] ABSTRACT

A conveyor assembly comprises an unloader, particularly for the unloading of bulk materials from ships, comprising a traveling member carrying a boom with a hollow jib which pivotally supports the upper end of a generally vertically extending hollow chute or column of a first conveyor structure which includes an endless conveyor member arranged within the hollow chute and the jib and extends from an annular hopper at the lower end of the chute to its inner discharge at a vertical shaft of the traveling unloader. A support is rotatably mounted at the lower end of the hollow chute and carries a second endless member conveyor. The second endless member conveyor is guided at its lower end over a pulley which is located below the lower end of the chute, and on the side opposite to the rotational axis of the support, there is a deflecting pulley on the end of a pivotal boom which may be adjusted in a vertical plane in order to vary the position of the lower end of the second endless member conveyor which may, for example, be a bucket conveyor. The second endless member conveyor is arranged so that it empties the material conveyed thereby into a central hopper below the chute so that the first endless member conveyor picks it up and transports it through the chute and the jib to the receiving shaft.

6 Claims, 2 Drawing Figures

FIG. I

CONVEYOR ASSEMBLY

FIELD AND BACKGROUND OF THE INVENTION

The present invention relates to a vertical conveyor comprising a receiving unit which is mounted on the bottom end of the conveyor for pivotal movement about the vertical axis thereof and is adapted for delivering the material to an annular conveyor which is also mounted coaxially of the vertical axis.

DESCRIPTION OF THE PRIOR ART

A known conveying device, particularly for unloading of ships, includes a vertically extending endless member conveyor. The device comprises a portal structure capable of traveling along a pier or quay and includes a lattice jib which is displaceable transversely to the pier. The vertical conveyor is carred at the front end of the jib and is mounted for lifting and lowering motion and it can be lifted or lowered by means of a pulley case. The vertical conveyor may include a hollow column with two conveyor belts arranged therein running in opposite directions and which includes a receiving unit at its lower end. The receiving unit includes a combination of a sprocket cylinder, a scraper chain and a guide band. The receiving unit is mounted for pivotal movement about the vertical axis of the hollow column. For the material delivery, an annular conveyor is provided which surrounds the hollow column and transfers the material supplied by the receiving unit to the two oppositely directed conveyor belts. At the upper end of the vertical conveyor, the material is delivered through a chute to a conveyor belt which is mounted on the lattice jib. Two further conveyor belts, of which one is reversible, convey the material to the belt conveyor flights provided on the quay wall as disclosed and described in U.S. Pat. No. 3,939,570.

SUMMARY OF THE INVENTION

The invention provides a conveyor assembly, which includes a vertical conveyor portion constructed to insure satisfactory reception of the material below the vertical conveyor, and it is adapted to economically discharge loading spaces of ships having particularly small hatchways without requiring additional auxiliary means. The lower receiving unit comprises a bucket chain endless member conveyor which is guided by guide pulleys which include a guide pulley located below the lower end of the vertical conveyor and another pulley which is mounted on the opposite side of the pivotal axis of the receiver on the vertical conveying unit.

The inventive vertical conveyor has the advantage that the receiving unit may operate continuously in the space below the vertical conveyor and that due to its easy adjustment of the extension of the conveyor endless member with the bucket chain when working in a zone or loading space which is partly covered by a deck or similar obstacle, the material may nevertheless be securely picked up without additional means. In a further aspect of the invention, the supporting frame of the bucket chain is mounted for swivelling movement on a circular flange provided at the lower end of the vertical conveyor.

According to another very simple development of the invention, the supporting frame of the bucket chain for the receiving endless conveyor or second conveyor carries the bearing base of an annular conveyor. The annular conveyor may be mounted for rotation independently of the bucket chain and it is advantageously provided with a material stripper.

In accordance with a further development of the invention, the pivoted arm of the bucket chain may be mounted for swinging about a horizontal axis. Such a design has the advantage that while using the vertical conveyor for unloading of ships having small hatchways, the bucket chain of the receiving unit can be lowered to pass through the hatchway and, at the same time, to move outwardly to occupy a position which is necessary for the starting cut into the material to be unloaded.

In still another embodiment of the invention, two bucket chains are provided bilaterally of the bottom end of the vertical conveyor. With such an arrangement, a uniform loading of the vertical conveyor can be obtained.

Accordingly, it is an object of the invention to provide an improved conveyor structure or assembly, which includes a vertically extending first endless member conveyor with a second conveyor supporting frame rotatably mounted at the lower end of the first conveyor and having an endless member which is guided by a pulley located below the lower end of the vertical conveyor and which includes a deflecting pulley extending outwardly on the opposite side of the swivel axis and which is advantageously carried on an adjustable boom which may be shifted about a horizontal axis.

A further object of the invention is to provide a conveying structure which includes a vertical chute with an endless member bucket conveyor operable therein to lift material upwardly therein and which includes an annular conveyor rotatably mounted around the lower end of said conveyor and a supporting frame for a second conveyor having guide pulleys for guiding the endless conveyor transversely and which include at least one lower guide pulley below the lower end of the first endless member conveyor and a second guide pulley which may be adjustably positioned on the other side of the swivel axis for extending and retracting the second endless member conveyor.

A further object of the invention is to provide a conveyor structure which is simple in design, rugged in construction, and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
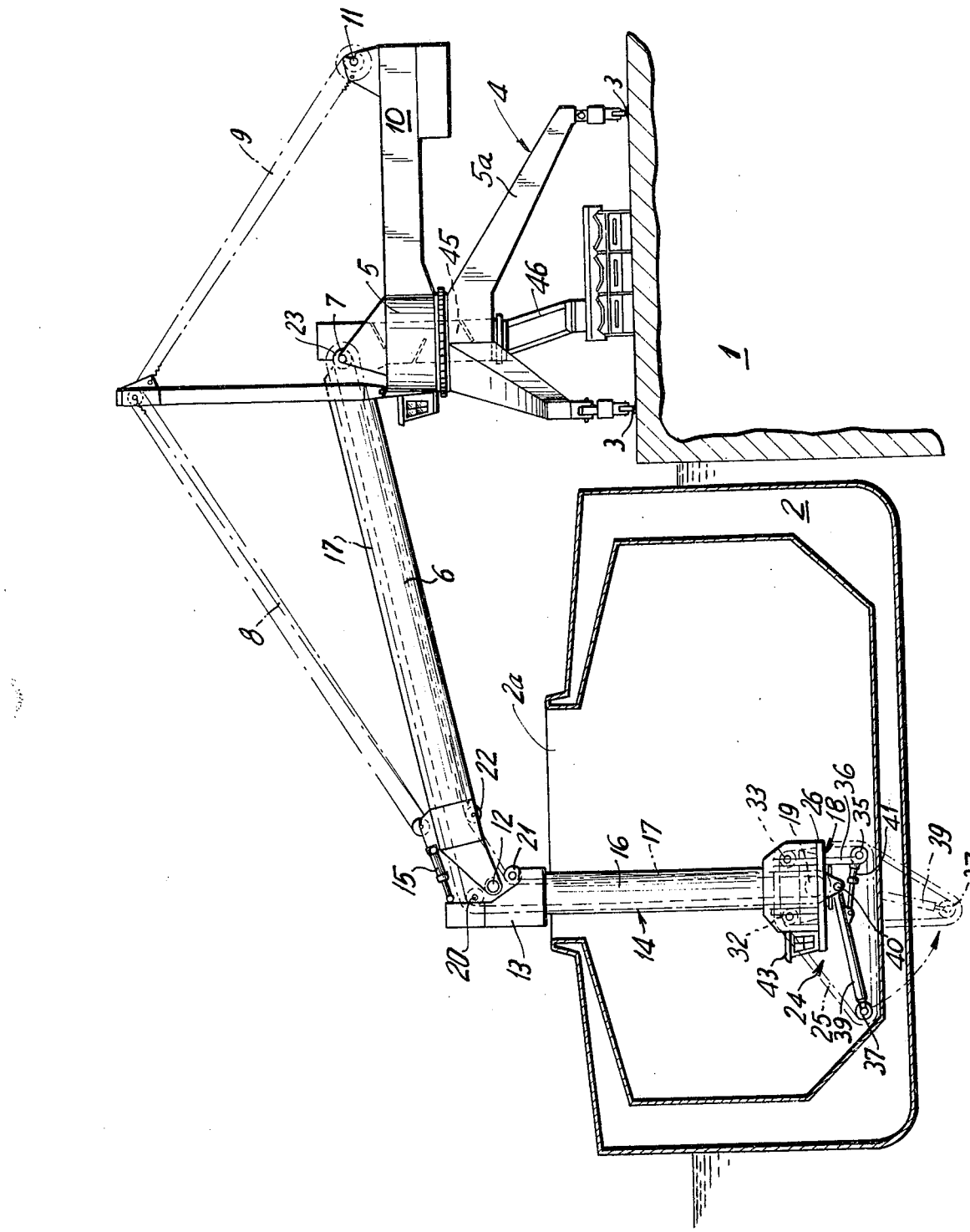
FIG. 1 is a side elevational view partly in section of an unloading device having a conveyor assembly construction in accordance with the invention.

Referring to the drawings in particular, the invention embodied therein, comprises an unloader for unloading a ship 2, which is shown as being located alongside a pier or quay 1. The ship is divided by hatches into a plurality of longitudinally arranged compartments (not shown). The unloader comprises a portal-type unloader, and carries a superstructure 5 which can swivel through 360° on a wheeled mounting base 5a which is guided over tracks 3 running along the edge of pier 1. A jib 6 comprises a hollow tubular member and it is hinged for swinging about a horizontal axis 7. The outer or front end of jib 6 is retained by means of a tackle 8 and a hoist gear 11 is provided on a counterweight boom 10 to which the wire cable ends 9 are attached.

A head piece 13 which is carried at the front end of jib 6 supports a vertical conveyor 14 which is hinged for pivotal movement about a horizontal axis 12. A hydraulic cylinder 15 serves to adjust the vertical position of the vertical conveyor at various inclinations of the jib 6. The vertical conveyor 14 comprises a hollow tubular member or column 16 and an endless member first conveyor or bucket elevator 17 which advantageously comprises a rubber belt bucket elevator. The elevator rides within the interior of the column 16 and it extends at its upper end over guide pulleys 20, 21 and 22 through the interior of jib 6 and over a return drum 19 which is located at the bottom end 18 of column 16. At the other end, the bucket elevator 17 is run over a drive drum 23 at the upper inner end of the jib 6 on the superstructure 5 coaxially of the horizontal axis 7.

In accordance with the invention, a receiving unit or second endless member conveyor, generally designated 24, is rotatably supported at the lower end of hollow column 16. It comprises an endless member or bucket chain 25 which is guided on pulleys 32, 33, 35 and 37 carried by a supporting frame which is rotatable relative to the lower end of the chute 16. Supporting frame 26 is supported by means of ball bearing slewing gear 27 for swiveling motion over a circular flange 28 provided below the bottom end of column 16.

In accordance with another feature of the invention, an annular conveyor or receiving conveyor 30 is mounted on slewing gear 29 above support 26 and it permits annular conveyor 30 to pivot about hollow column 16. For this purpose, a swivel drive 31 is mounted on supporting frame 26 and is capable of producing an independent movement of the annular conveyor separate from the receiving unit 24. The swivel drive for receiving unit 24 (not shown) serves to pivot the receiving unit about the vertical axis (not shown).

Figure 2:
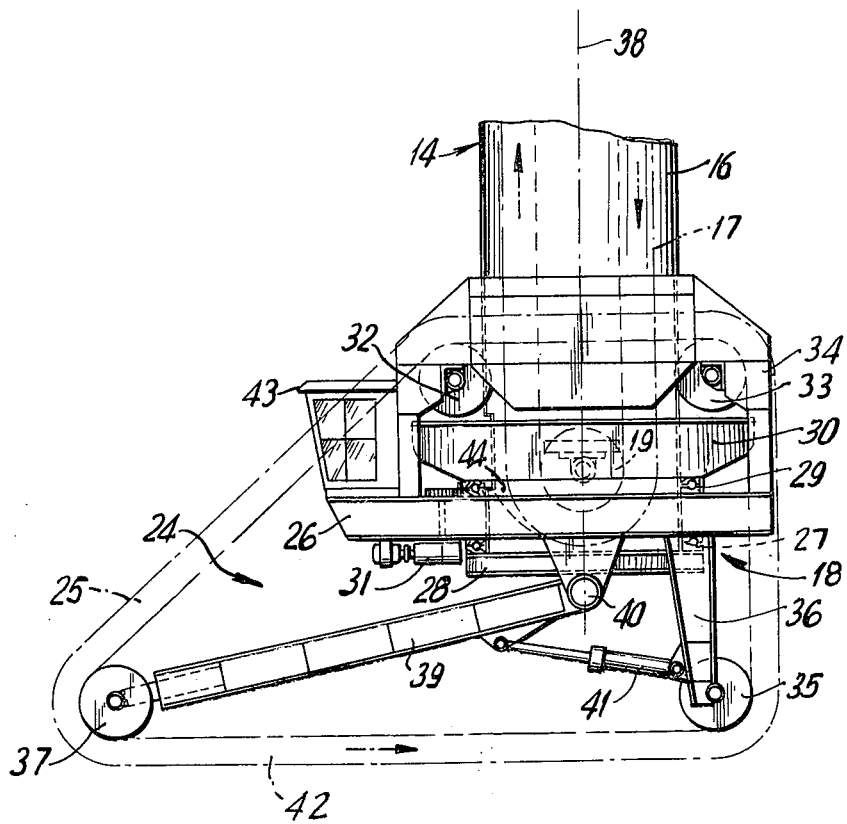
FIG. 2 is an enlarged partial elevational view of the receiving conveyor portion at the lower end of the vertical conveyor portion shown in FIG. 1.

Bucket chain 25 of receiving unit 24 is passed in the upper part around two deflecting pulleys 32 and 33 which are mounted on support 34 over the annular conveyor 30. Pulley 33 is driven by a drive (not shown). Bucket chain 25 is also guided over a deflecting pulley 35 which is located below the driven pulley 33 and laterally of, and below the bottom end of the hollow column 16. The deflecting pulley 35 is mounted on a bracket 36 which is secured to the lower edge of the supporting frame 26. A further deflecting pulley 37 is arranged opposite to the deflecting pulley 35 on the opposite side of the vertical swivel axis 38 of the vertical conveyor 14 and it is carried by an adjustable pivot arm 39. Pivot arm 39 is pivotable about a horizontal axis 40 which is located at the lower edge of supporting frame 26. In order to adjust the vertical position of pivoted arm 39, a spindle or hydraulic drive 41 is provided which is pivoted at one end to the bracket 36 and connected at its opposite end to arm 39. Hydraulic drive 41 may lower the side 42 of bucket chain 25 in exactly parallel position relative to the ship bottom, as shown in FIGS. 1 and 2, or it may pivot downwardly to the dotted line position shown in FIG. 1 particularly for the purposes of entering a smaller size hatch opening, such as the hatch opening 2a. In addition, for digging a trench, the arm may be located to the dotted line position shown. An operator's cabin 43 is mounted on supporting frame 26 and located so that the operation of the bucket chain 25 and its delivery of the material may be observed at any time.

The material to be removed from the loading space of ship 2 is scooped up by the bucket chain 25. Buckets 25 are passed over the deflecting pulley 33 so that the material is dumped through a chute into the annular conveyor 30. Annular conveyor 30 rotates below bucket chain 25. Annular conveyor 30 is provided with a stripper (not shown) for guiding the material through an opening provided in hollow column 16 and into a central hopper 44 defined at the lower end of the column.

The bucket elevator 17 then engages the material in the hopper and lifts it upwardly in the interior of hollow column 16 through jib 6 to a gradual chute or shaft 45 which is provided in the swivel center of the unloading mechanism 4. Finally, by means of a distribution belt 46 which is mounted on the portal-type understructure 5a, the material is conveyed to the respective desired belt conveyor flight on the pier for further transportation.

While a specific embodiment of the invention has been shown and described in detail to illustrate the application of the principles of the invention, it will be understood that the invention may be embodied otherwise without departing from such principles.

What is claimed is:

1. A conveyor assembly, comprising a support structure, a first conveyor mounted on said support structure and being positionable in a substantially vertical position, a supporting frame mounted around said first conveyor adjacent the lower end thereof, said frame and said first conveyor being relatively rotatably movable in respect to each other so that there is a relative rotation about the axis of the first conveyor in respect to said frame, a second conveyor comprising a bucket chain conveyor having an endless chain with a plurality of buckets therealong and being carried on said supporting frame and including a lower reach extending laterally of said first conveyor and below said frame, a guide roller for said second conveyor carried by said supporting frame and being located below and on one side of said first conveyor, and a pivot arm rotatably supporting said deflecting roller and pivoted on said supporting frame to extend outwardly from said frame on the opposite side of said frame from said guide roller, said second conveyor chain being guided over said guide roller and said deflecting roller through a path which may be shifted laterally and vertically by adjustment of the angular position of said pivot arm by pivoting said pivot arm, and means on said supporting frame for pivoting said pivot arm, said second conveyor also including an upper portion located above said supporting frame, and a receiving conveyor located on said supporting frame below the upper portion of said second conveyor in a position to receive material from said buckets and to deliver the material to said first conveyor.

2. A conveyor assembly, according to claim 1, wherein said support structure comprises a movable crane, a jib supported on said crane, means at the outer end of said jib pivotally supporting said vertical conveyor, said first endless member conveyor including a closed tubular chute having an endless member conveyor elevator operable therethrough and through said jib, means at the inner end of said jib for receiving material therefrom.

3. A conveyor assembly, according to claim 2, wherein said supporting frame is rotatably mounted at the lower end of said chute, said receiving conveyor being rotatably supported on said supporting frame for rotation around said chute, said second conveyor having a deflecting roller located over said annular conveyor so that the buckets of said second conveyor are emptied into said annular conveyor.

4. A conveyor for delivering bulk material from a storage space particularly for unloading ships, comprising means defining a first conveyor adapted to extend generally vertically into the storage space, a support adjacent the lower end of said first conveyor, at least one second conveyor comprising an endless member having buckets therealong and being carried on said support and including a plurality of guide pulleys rotatably mounted on said support, said endless member travelling over said guide pulleys, a third annular conveyor carried by said support and located below at least one of said guide pulleys in a position to receive material from said second conveyor when said endless member and the buckets move thereover, at least one of said guide pulleys being mounted below the bottom end of said first conveyor, a swing arm pivoted to said support for angular movement and having an outer free end, a deflecting pulley rotatably mounted on said swing arm adjacent the outer free end and engaged with said endless member, means to pivot said swing arm to deflect said endless member selectively laterally and downwardly to facilitate the positioning of the buckets so that they may reach the material located both below and to one side of said first conveyor.

5. A conveyor according to claim 4, wherein said support is rotatable around said first conveyor.

6. A conveyor according to claim 4, wherein said support is rotatable around said first conveyor about the axis of said first conveyor, said support having a portion spaced outwardly from the axis of said first conveyor with depending support carrying one of said guide pulleys, said swing arm being pivoted on said support and extending outwardly from said support in an opposite direction to said depending support for said guide pulley.

* * * * *